United States Patent Office 3,297,708
Patented Jan. 10, 1967

3,297,708
METHOD OF PREPARING THIAZOLIDINES
Murray Garber, Trenton, and Bernard Miller, Plainsboro, N.J., assignors to American Cyanamid Company, Stamford, Conn., a corporation of Maine
No Drawing. Filed Oct. 6, 1965, Ser. No. 493,549
5 Claims. (Cl. 260—306.7)

This invention relates to a novel process for the preparation of imino-thiazolidines. More particularly, the invention relates to the preparation of 2-imino-thiazolidine, analogues of 2-imino-thiazolidine, and salts of said compounds.

The compounds prepared by the present process can be illustrated by the formula:

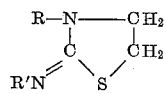

and acid salts thereof wherein R and R' are members selected from the group consisting of hydrogen, alkyl, lower alkenyl, mononuclear aryl, mononuclear aryl (lower) alkyl and lower alkyl mononuclear aryl.

In accordance with the present invention, the above-identified compounds are prepared by reaction of a compound of the formula:

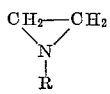

wherein R is a member selected from the group consisting of hydrogen, alkyl, lower alkenyl, mononuclear aryl, mononuclear aryl (lower) alkyl and lower alkyl mononuclear aryl with a compound of the formula:

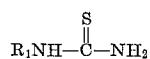

wherein $R_1$ is hydrogen, alkyl, lower alkenyl, mononuclear aryl, mononuclear aryl (lower) alkyl and lower alkyl mononuclear aryl.

The present process involves the addition of ethylenimine (aziridine) or a substituted derivative to an acidic solution of thiourea or analog of thiourea. The reaction is exothermic and is preferably conducted in water but may be carried out in non-polar solvents such as methylisobutyl ketone, methylethyl ketone, ethyl acetate and the like. Although the reaction may be conducted over a wide temperature range; for example, between about 0° C. and 100° C., the optimum yield of desired product is generally obtained when the temperature is maintained between about 0° C. and 30° C. After addition of the imine or aziridine to the acidic thiourea solution is complete, the reaction mixture is heated to refluxing temperature. After refluxing, the thiazoline or thiazolidine formed by the reaction is readily recovered.

In the preferred process where water is used as the reaction medium, the mixture is treated with an alkaline agent such as ammonium hydroxide, sodium hydroxide, potassium bicarbonate or the like thereby converting the acid salt of the thiazoline or thiazolidine to the free base. This is recovered by treating the resulting mixture with an organic solvent such as benzene, chloroform, toluene, methylisobutyl ketone, methylethyl ketone or the like, separating the organic solution from the aqueous solution and evaporating the solvent from the organic solution.

When the process of the invention is carried out in a non-aqueous polar solvent, the reaction mixture, following refluxing, is treated with an alkaline agent as in the aqueous system and then evaporated to dryness, leaving the free base of the thiazoline or thiazolidine. In the latter method, it is both desirable and economically feasible to provide means for recovering the organic solvent.

Among the ethylenimine and substituted ethylenimines contemplated for use in the process of this invention are: ethylenimine, 1-benzylaziridine, 1-phenethylaziridine, 1-phenethanolaziridine, 1-phenylaziridine, 1-cyclohexylaziridine, 1-methylaziridine, 1-ethylaziridine, and 1-butylaziridine.

Among the thiourea and thiourea analogues contemplated for use in the process of this invention are: 1-isopropoyl-2-thiourea, 1-isobutyl-2-thiourea, 1-isopentyl-2-thiourea, 1-hexyl-2-thiourea, 1-decyl-2-thiourea, 1-dodecyl-2-thiourea, 1-propyl-2-thiourea, 1-hexadecyl-2-thiourea, 1-allyl-2-thiourea, 1-ethyl-2-thiourea, 1-sec-butyl-2-thiourea, 1-tert-butyl-2-thiourea, 1-benzyl-2-thiourea, 1-(1-methylallyl) - 2 - thiourea, 1 - (1 - naphthyl) - 2 - thiourea, 1-phenethyl-2-thiourea, 1-phenyl-2-thiourea, 1-(2-methylallyl) - 2 - thiourea, 1 - (1,2 - diphenylethyl) - 2 - thiourea, 1 - diphenylmethyl - 2 - thiourea, 1 - cyclohexyl-2-thiourea.

Heretofore preparation of 2-imino-thiazolidine has been rather tedious and relatively costly. The available process has involved several distinct reactions employing a variety of materials and was time consuming. Briefly, it involved treatment of β-hydroxyethylamine with gaseous hydrogen chloride in the presence of chloroform to form the 2-hydroxyethylammonium chloride which was in turn treated with thionyl chloride to produce 2-chloroethylammonium chloride. This product was then treated with thiourea in the presence of water and then base to form the 2-imino-thiazolidine.

This process is shown graphically below.

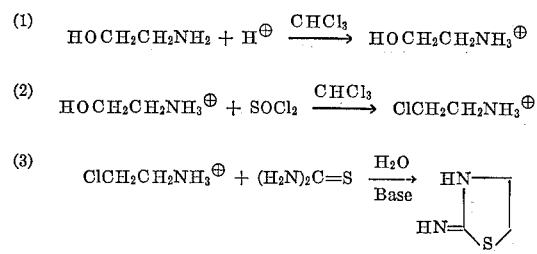

The advantages of the process of the instant invention are clear when a comparison between it and the known process is made. The advantages are three-fold: (1) lower material cost, (2) simpler processing, and (3)

reduction in processing time. Graphically, the process of the invention may be shown as follows:

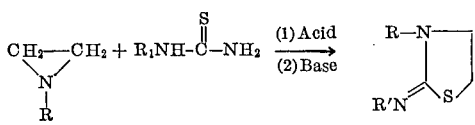

wherein R and R' are as defined hereinbefore.

The use of 2-imino-thiazolidine as an intermediate in the preparation of 6-phenyl-2,3,5,6-tetrahydroimidazo[2,1-b]thiazolium chloride, a highly effective anthelmintic is shown by the following procedure.

Preparation of the specific anthelmintic 6-phenyl-2,3,5,6-tetrahydroimidazo[2,1-b]thiazolium chloride is accomplished by the process shown graphically below.

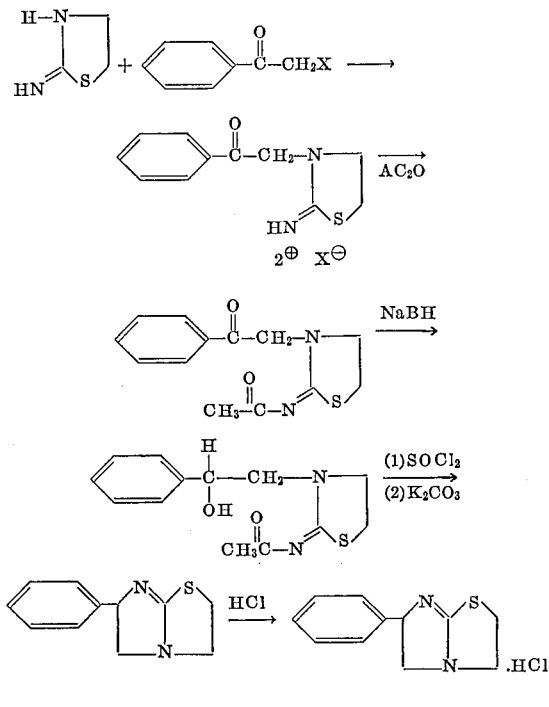

wherein X is halogen.

The following examples illustrate in detail the preparation of representative imino-triazolidines of the present invention.

EXAMPLE 1

*Preparation of 2-imino-thiazolidine*

To a solution of 0.1 mole of thiourea in aqueous 50% sulfuric acid (cont'g. 1.0 mole of real sulfuric acid) is added slowly and with cooling 0.1 mole of ethylenimine (aziridine) at 5°–15° C. Upon completion of the addition, the reaction mixture is heated and refluxed for 2 hours (100°–106° C.). Upon cooling, 37.5 ml. of chloroform is added and the mixture made basic with concentrated ammonium hydroxide. The chloroform layer is separated and the aqueous extracted twice with 37.5 ml. of chloroform. The chloroform layers are combined and evaporated to dryness. In this way a 93% yield of 2-imino-thiazolidine, a white crystalline material, melting point 79°–81.0° C., is obtained. The following shows graphically the preparation of the compound of the example.

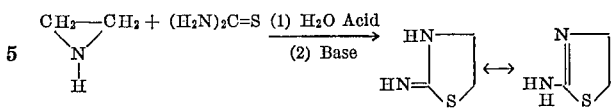

The product may exist in the forms shown above.

EXAMPLE 2

Following the procedure of Example 1 above but substituting approximately equimolar amounts of the appropriate aziridine and/or analog of thiurea in place of ethylenimine and/or thiourea yields a corresponding thiazolidine as shown by the graphic reactions described below. In each reaction it is desirable to maintain the temperature of the reaction mixture between about 0° C. and 30° C. during addition of the aziridine to the acid aqueous substituted thiourea mixture. After addition is complete and the mixture is refluxed, it is cooled, mixed with an organic solvent such as chloroform, and the thiazolidine recovered from the organic solution as described in Example 1.

(A) *Preparation of 2-methylimino-3-methyl thiazolidine*

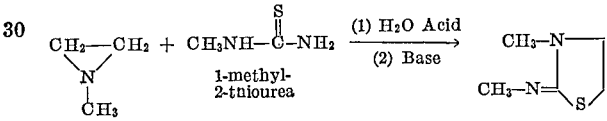

(B) *Preparation of 2-butylimino-3-ethyl thiazolidine*

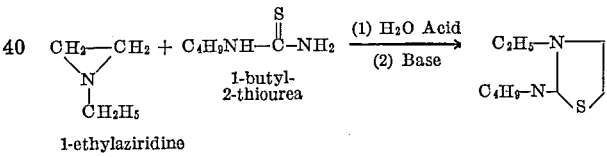

(C) *Preparation of 2-dodecylimino-3-phenyl thiazolidine*

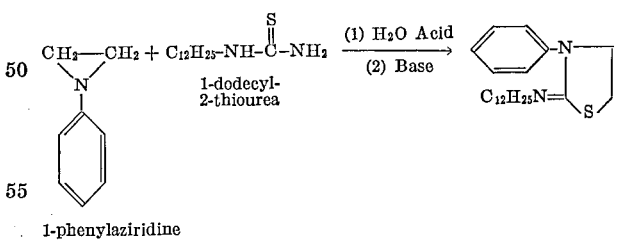

(D) *Preparation of 2-benzylimino-3-isobutyl thiazolidine*

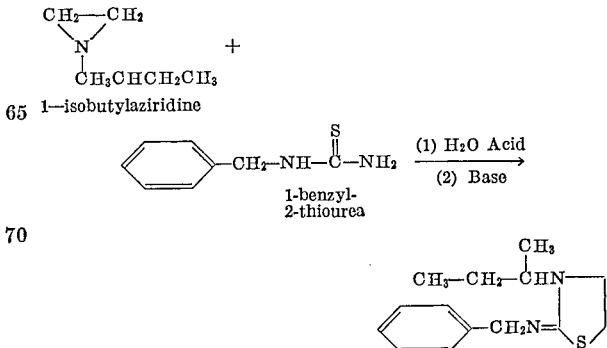

(E) *Preparation of 2-ethylphenylimino-3-ethylphenyl thiazolidine*

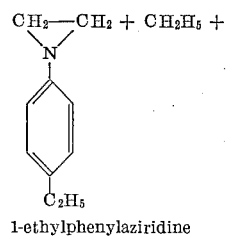

1-ethylphenylaziridine

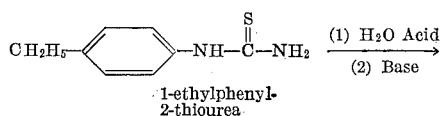

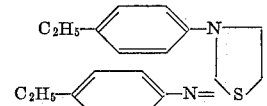

(F) *Preparation of 2-allylimino-3-cyclohexyl thiazolidine*

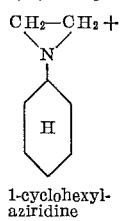

1-cyclohexylaziridine

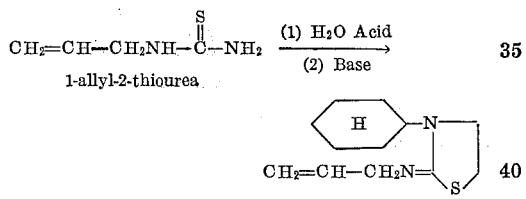

(G) *Preparation of 2-hexyl thiazolidine*

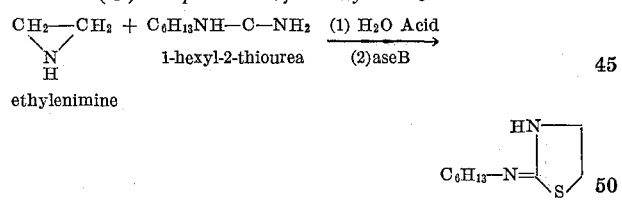

(H) *Preparation of 2-methyl-3-ethyl thiazolidine*

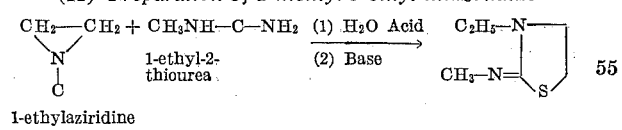

1-ethylaziridine (I) *Preparation of 2-imino-3-benzyl thiazolidine*

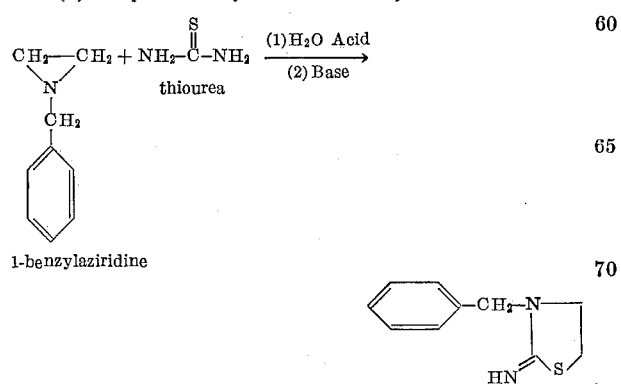

1-benzylaziridine (J) *Preparation of 2-ethylimino thiazolidine*

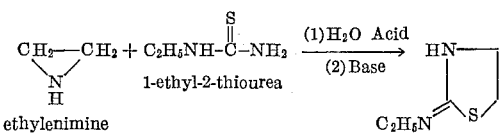

(K) *Preparation of 2-decylimino thiazolidine*

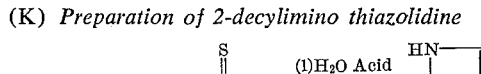

(L) *Preparation of 2-imino-3-phenyl thiazolidine*

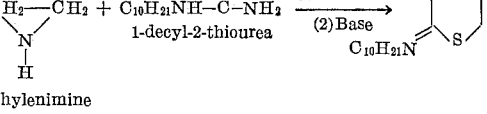

1-phenylaziridine (M) *Preparation of 2-(2-methylallylimino) thiazolidine*

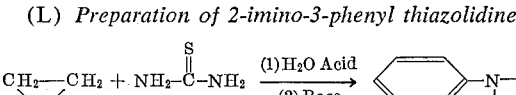
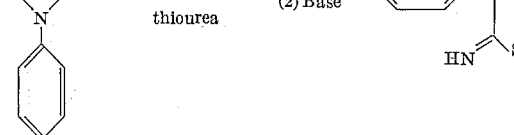

(N) *Preparation of 2-imino-3-methyl thiazolidine*

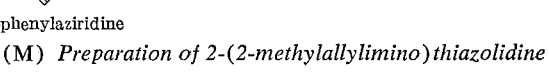
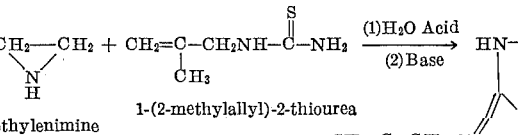

methylaziridine (O) *Preparation of 2-imino-3-ethyl thiazolidine*

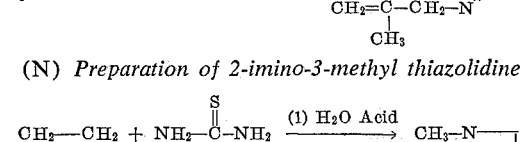

1-ethylaziridine

EXAMPLE 3

The compound dl-2,3,5,6-tetrahydro-6-phenyl-imidazo[2,1-b]thiazole hydrochloride was tested by standard parasitological procedures for evaluating anthelmintic efficacy, i.e. (1) in most cases the "critical" test in which the number of worms eliminated in the feces following treatment is compared with the total number of worms present, i.e., the sum of those eliminated and those present at necropsy, and (2) the "controlled" test method in which the average numbers of worms present in treated animals is compared at necropsy several days after treatment with the average number present in similarly infected but untreated animals. Depending upon the host species and the particular helminth studied the infections were experimentally induced or in some cases naturally acquired. The tests showed that dl-2,3,5,6-tetrahydro-6-phenyl-imidazo[2,1-b]thiazole hydrochloride and some of its analogs are highly active against a very broad spectrum of nematode parasites of mammals and birds at low dosages, and by varied routes of administration. The following table gives illustrative representative results obtained in testing the above described imidazothiazole, and is not intended to be limiting in regard to dose ranges, routes of administration, or species of nematodes. Data refer to adult helminths unless otherwise indicated.

TABLE

| Host | Doses mg./kg. (or other) | Route of Administration | Approximate Percent Average Efficacy | Type of test: (1) critical, (2) controlled | Species of Adult [1] Nematode |
|---|---|---|---|---|---|
| Mouse | 100 | Oral Gavage | 100 | (2) | Syphacia, Aspiculuris. |
|  | 25 | do | 95-100 | (2) | Nematospiroides dubius. |
|  | 20 | Subcutaneous | 80 | (2) | Nematospiroides dubius. |
|  | ([2]) | Drug-Diet | 90 | (2) | Ascaris suum larvae. |
|  |  |  | 100 | (2) | N. dubius. |
| Sheep | 3.75-10 | Oral Drench | 100 | (1) | Haemonchus contortus. |
|  | 3.75-10 | do | 85-99 | (1) | Nematodirus sp. |
|  | 5-10 | do | 90-100 | (1) | Trichostrongylus axei. |
|  | 10 | do | 94 | (1), (2) | Ostertagia circumcincta. |
|  | 15 | do | 100 | (1), (2) | Ostertagia circumcincta. |
|  | 7.5-10 | do | 95 | (1) | Trichostrongylus colubriformis and T. vitrinus. |
|  | 2.5-7.5 | Subcutaneous | 100 | (1) | H.c. |
|  | 5-7.5 | do | 95 | (1), (2) | O.c. |
|  | 2.5-7.5 | do | 99 | (1) | T.c. and T.v. |
|  | 5-7.5 | do | 97-100 | (1) | Nematodirus sp. |
|  | 15 | Oral Drench | 99 | (2) | H.c. larvae. |
|  | 15 | do | 99 | (2) | T.c. larvae. |
|  | 15 | Subcutaneous | 87 | (2) | O.c. larvae. |
| Cattle | 2.5-10 | Oral Drench | 100 | (1) | Haemonchus placei. |
|  | 7.5-20 | do | 80-100 | (1) | T. axei. |
|  | 7.5-20 | do | 80-100 | (1), (2) | Ostertagi sp. |
|  | 5-10 | do | 100 | (1) | Cooperia sp. |
|  | 7.5 | do | 100 | (1) | Nematodirus sp. |
|  | 5-10 | do | 100 | (1) | Oesophagostomum sp. |
|  | 5-10 | Intramuscular or Subcutaneous. | 100 | (1) | H.p. |
|  | 5-20 | do | 90+ | (1) | T. axei. |
|  | 5-20 | do | 90+ | (1), (2) | Ostertagia sp. |
|  | 5-10 | do | 100 | (1) | Cooperia sp. |
|  | 5-10 | Intramuscular | 100 | (1) | Nematodirus sp. |
|  | 5-10 | do | 100 | (1) | Oes. sp. |
|  | 5-10 | do | 100 | (1) | Bunostomum sp. |
|  | 7.5 | Intraperitoneal | 100 | (1) | H.p. |
|  | 7.5 | do | 80 | (1) | T. axei. |
|  | 7.5 | do | 90 | (1), (2) | Ostertagia sp. |
|  | 7.5 | do | 100 | (1) | Cooperia sp. |
|  | 7.5 | do | 100 | (1) | Nematodirus sp. |
|  | 7.5 | do | 100 | (1) | Bonostomum sp. |
| Swine | 5 | Oral Capsule or Feed | 100 | (1) | Ascaris suum. |
|  | 10 | In Drinking Water | 100 | (1) | Ascaris suum. |
|  | 2.5-10 | In Drinking Water, Oral Capsule. | 100 | (1) | Metastrongylus sp. |
|  | 10-20 | In Drinking Water | 85 | (1) | Oesophagostomum sp. |
|  | ([3]) | In Feed Continuously | 95 | (2) | Ascaris suum larvae. |
| Dog | 5 | Subcutaneous | 99 | (1) | Ancylostoma caninum. |
|  | 10 | Oral Capsule | 90 | (1) | Toxacara canis. |
|  | 10 | do | 100 | (1) | Toxascaris leonia. |
| Chicken | 80 | In Drinking Water | 90+ | (2) | Ascaridia galli larvae. |

[1] Unless otherwise indicated.
[2] 0.1% in feed.
[3] 0.0125% in feed.

What is claimed is:

1. A process of preparing thiazolidines selected from the group consisting of the formula:

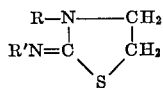

and acid salts thereof wherein R and R′ are members selected from the group consisting of hydrogen, alkyl, lower alkenyl, mononuclear aryl, mononuclear aryl (lower) alkyl, and lower alkyl mononuclear aryl comprising; treating a compound of the formula:

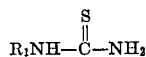

wherein $R_1$ is as defined above, with a compound of the formula:

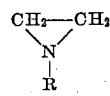

wherein R is as defined above, in acid solution at a temperature within the range of about 0° C. to about 100° C. and recovering said compounds therefrom.

2. A process for the preparation of 2-imino-thiazolidine comprising treating an aqueous acidic solution of thiourea with ethylenimine, at a temperature between 0° C. and 100° C., subsequently heating said solution to refluxing temperature and recovering said product therefrom.

3. A process according to claim 2 wherein the aqueous acidic solution is maintained at a temperature between 0° C. and 30° C.

4. A process according to claim 2 wherein the reflux mixture is neutralized with an alkaline agent, the neutralized solution treated with an organic solvent, the organic solvent solution separated from the aqueous solution and 2-imino-thiazolidine recovered therefrom.

5. A process of preparing thiazolidines selected from the group consisting of the formula:

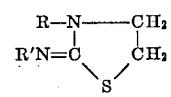

and acid salts thereof wherein R and R′ are members selected from the group consisting of hydrogen, alkyl, lower alkenyl, mononuclear aryl, mononuclear aryl (lower) alkyl and lower alkyl mononuclear aryl comprising contacting an acid solution of a thiourea of the formula:

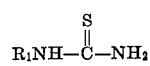

wherein $R_1$ is as defined above, with an aziridine of the formula:

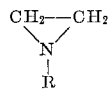

wherein R is as defined above, in the presence of a nonpolar solvent, maintaining the temperature of said solution at between about 0° C. and 30° C. during mixing of reactants, subsequently heating said solution to refluxing temperature, cooling, neutralizing with an alkaline agent and thereafter evaporating the solution and recovering said thiazolidines therefrom.

No references cited.

ALEX MAZEL, *Primary Examiner.*

ALTON D. ROLLINS, *Assistant Examiner.*

Notice of Adverse Decision in Interference

In Interference No. 97,461 involving Patent No. 3,297,708, M. Garber and B. Miller, METHOD OF PREPARING THIAZOLIDINES, final judgment adverse to the patentees was rendered Mar. 21, 1972, as to claim 5.

[*Official Gazette October 31, 1972.*]